United States Patent
Chen

(10) Patent No.: US 8,098,251 B2
(45) Date of Patent: Jan. 17, 2012

(54) SYSTEM AND METHOD FOR INSTRUCTION LATENCY REDUCTION IN GRAPHICS PROCESSING

(75) Inventor: Lin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 994 days.

(21) Appl. No.: 12/035,667

(22) Filed: Feb. 22, 2008

(65) Prior Publication Data

US 2009/0213128 A1 Aug. 27, 2009

(51) Int. Cl.
*G06F 15/16* (2006.01)
*G06F 9/45* (2006.01)
(52) U.S. Cl. ......... 345/503; 717/151; 717/156; 717/161
(58) Field of Classification Search .................. 345/502, 345/522
See application file for complete search history.

(56) References Cited

U.S. PATENT DOCUMENTS

| | | | |
|---|---|---|---|
| 5,710,912 A * | 1/1998 | Schlansker et al. | 712/220 |
| 6,731,294 B1 | 5/2004 | Mang et al. | |
| 7,392,516 B2 | 6/2008 | Vasilevskiy et al. | |
| 7,681,187 B2 * | 3/2010 | Ludwig et al. | 717/151 |

OTHER PUBLICATIONS

Wolfram Amme, Peter Braun, Eberhard Zehendner, Francois Thomasset, "Data Dependence Analysis of Assembly Code", Parallel Architectures and Compilation Techniques, 1998. Proceeding, p. 340-347, Oct. 12-18, 1998.*
Mark Heffernan and Kent Wilken, "Data-Dependency Graph Transformations for Instruction Scheduling", Journal of Scheduling, vol. 8, No. 5, p. 427-451, Oct. 2005.*
European Search Report and Search Opinion—EP08006447, International Search Authority—European Patent Office—Jun. 16, 2009.
International Search Report and the Written Opinion—PCT/US2009/034792, International Search Authority—European Patent Office—Nov. 20, 2009.

* cited by examiner

*Primary Examiner* — Kee M Tung
*Assistant Examiner* — Sing-Wai Wu
(74) *Attorney, Agent, or Firm* — Matthew J. Evans; James R. Gambale, Jr.

(57) ABSTRACT

A system, method and apparatus are disclosed, in which an instruction scheduler of a compiler, e.g., a shader compiler, reduces instruction latency based on a determined instruction distance between a dependent predecessor and successor instructions.

50 Claims, 13 Drawing Sheets

I1: ADD R1:XYZ, R2:XYZ, R3:XYZ  _702_
I2: MUL R4.X, R1.X, R1.Y

| INSTR. | OPERAND | MASK | |
|---|---|---|---|
| I1 | R1 | MD: XYZ | _704_ |
| I2 | R1 | MS1: X | |
| I2 | R1 | MS2: Y | |

Mask Distance(MD, MS1) = 2:  _706_

| COMPONENT | M | COMPONENT DISTANCE | |
|---|---|---|---|
| X | XYZX | 2 | _708_ |
| Y | XYZX | +INF | |
| Z | XYZX | +INF | |
| W | XYZX | +INF | |

Mask Distance(MD, MS2) = 1:  _710_

| COMPONENT | M | COMPONENT DISTANCE | |
|---|---|---|---|
| X | XYZY | +INF | _712_ |
| Y | XYZY | 1 | |
| Z | XYZY | +INF | |
| W | XYZY | +INF | |

Instruction Distance(I1, I2) = Smaller of:  _714_
    Mask Distance(MD, MS1) and
    Mask Distance(MD, MS2) = 1

FIGURE 7

```
0(91)  type2: rcp r9.w, r8.w
1(93)  type3: (rpt2)fmul r10.x, (r)r4.x, r9.w
2(95)  type3: (rpt2)fmul r11.x, (r)r5.x, r9.w
3(97)  type3: (rpt2)fmul r12.x, (r)r6.x, r9.w
4(99)  type3: (rpt2)fmul r13.x, (r)r7.x, r9.w
5(102) type3: (lock)fmul dummy, r11.x, r11.x
6(103) type3: (rpt1)fmac r9.x, (r)r11.y, (r)r11.y
7(105) type2: rsq r9.x, r9.x
8(107) type3: (rpt2)fmul r9.x, r9.x, (r)r11.x
9(110) type3: (lock)fmul dummy, r12.x, r12.x
10(111) type3: (rpt1)fmac r14.x, (r)r12.y, (r)r12.y
11(113) type2: rsq r14.x, r14.x
12(115) type3: (rpt2)fmul r14.x, r14.x, (r)r12.x
13(118) type3: (lock)fmul dummy, r10.x, r10.x
14(119) type3: (rpt1)fmac r15.x, (r)r10.y, (r)r10.y
15(121) type2: rsq r15.x, r15.x
16(123) type3: (rpt2)fmul r15.x, r15.x, (r)r10.x
17(125) type4: sample r16.XYZW, r3.xyyy, m1, s1
18(132) type4: fmad r17.z, c1.y, r16.y, -c1.x
19(134) type4: fmad r17.y, c1.y, r16.y, -c1.x
20(136) type4: fmad r17.x, c1.y, r16.x, -c1.x
21(138) type2: (rpt2)fmov r16.x, (r)r17.x
22(140) type3: (lock)fmul dummy, r16.x, r16.x
23(141) type3: fmac r16.z, r16.y, r16.y
24(143) type3: fadd r16.z, -c1.x, r16.z
25(145) type2: sqrt r16.z, -r16.z
26(147) type3: (lock)fmul dummy, r16.x, r9.x
27(148) type3: (rpt1)fmac r18.x, (r)r16.y, (r)r9.y
28(150) type3: (lock)fmul dummy, r16.x, r14.x
29(151) type3: (rpt1)fmac r18.y, (r)r16.y, (r)r14.y
30(153) type3: (lock)fmul dummy, r16.x, r15.x
31(154) type3: (rpt1)fmac r18.z, (r)r16.y, (r)r15.y
32(157) type3: (lock)fmul dummy, r18.x, r18.x
33(158) type3: (rpt1)fmac r20.x, (r)r18.y, (r)r18.y
34(160) type2: rsq r20.x, r20.x
35(162) type3: (rpt2)fmul r18.x, r20.x, (r)r18.x
36(165) type3: (lock)fmul dummy, r13.x, r13.x
37(166) type3: (rpt1)fmac r21.x, (r)r13.y, (r)r13.y
38(168) type2: rsq r21.x, r21.x
39(170) type3: (rpt2)fmul r21.x, r21.x, (r)r13.x
```

Fig. 8A

40(172) type3: (lock)fmul dummy, r21.x, r18.x
41(173) type3: (rpt1)fmac r22.x, (r)r21.y, (r)r18.y
42(175) type3: fmul r22.x, c2.x, r22.x
43(177) type4: (rpt2)fmad r22.x, r22.x, (r)r18.x, -(r)r21.x
44(180) type3: (lock)fmul dummy, r22.x, r22.x
45(181) type3: (rpt1)fmac r24.x, (r)r22.y, (r)r22.y
46(183) type2: rsq r24.x, r24.x
47(185) type3: (rpt2)fmul r22.x, r24.x, (r)r22.x
48(187) type3: (lock)fmul dummy, c3.x, r18.x
49(188) type3: (rpt1)fmac (sat)r25.x, (r)c3.y, (r)r18.y
50(190) type4: fmad r25.x, c4.x, r25.x, c4.y
51(192) type3: (lock)fmul dummy, c3.x, r22.x
52(193) type3: (rpt1)fmac (sat)r25.y, (r)c3.y, (r)r22.y
53(196) type2: log r26.x, r25.y
54(197) type3: fmul r26.x, c6.x, r26.x
55(198) type2: exp r25.y, r26.x
56(200) type3: fmul r25.y, c0.w, r25.y
57(202) type4: sample r27.XYZW, r2.xyyy, m0, s0
58(204) type4: (rpt2)fmad r27.x, (r)r27.x, r25.x, r25.y
59(209) type2: sqrt r0.z, (r)r27.z
60(206) type2: (rpt1)sqrt r0.x, (r)r27.x
61(208) type0: end

Fig. 8B

0(125) type4: (syn)sample r16.XYZW, r3.xyyy, m1, s1
1(202) type4: (syn)sample r27.XYZW, r2.xyyy, m0, s0
2(91) type2: (syn)rcp r9.w, r8.w
3(132) type4: (syn)fmad r17.z, c1.y, r16.y, -c1.x
4(134) type4: (syn)fmad r17.y, c1.y, r16.y, -c1.x
5(136) type4: (syn)fmad r17.x, c1.y, r16.x, -c1.x
6(93) type3: (rpt2/syn)fmul r10.x, (r)r4.x, r9.w
7(95) type3: (rpt2/syn)fmul r11.x, (r)r5.x, r9.w
8(97) type3: (rpt2/syn)fmul r12.x, (r)r6.x, r9.w
9(99) type3: (rpt2/syn)fmul r13.x, (r)r7.x, r9.w
10(138) type2: (rpt2)fmov r16.x, (r)r17.x
11(118) type3: (lock)fmul dummy, r10.x, r10.x
12(119) type3: (rpt1)fmac r15.x, (r)r10.y, (r)r10.y
13(102) type3: (lock)fmul dummy, r11.x, r11.x
14(103) type3: (rpt1)fmac r9.x, (r)r11.y, (r)r11.y
15(110) type3: (lock)fmul dummy, r12.x, r12.x
16(111) type3: (rpt1)fmac r14.x, (r)r12.y, (r)r12.y
17(121) type2: rsq r15.x, r15.x
18(165) type3: (lock)fmul dummy, r13.x, r13.x
19(166) type3: (rpt1)fmac r21.x, (r)r13.y, (r)r13.y
20(105) type2: rsq r9.x, r9.x
21(140) type3: (lock)fmul dummy, r16.x, r16.x
22(141) type3: fmac r16.z, r16.y, r16.y
23(123) type3: (rpt2/syn)fmul r15.x, r15.x, (r)r10.x
24(113) type2: rsq r14.x, r14.x
25(107) type3: (rpt2/syn)fmul r9.x, r9.x, (r)r11.x
26(168) type2: rsq r21.x, r21.x
27(143) type3: fadd r16.z, -c1.x, r16.z
28(115) type3: (rpt2/syn)fmul r14.x, r14.x, (r)r12.x
29(170) type3: (rpt2/syn)fmul r21.x, r21.x, (r)r13.x
30(145) type2: sqrt r16.z, -r16.z
31(147) type3: (lock)fmul dummy, r16.x, r9.x
32(148) type3: (rpt1/syn)fmac r18.x, (r)r16.y, (r)r9.y
33(150) type3: (lock)fmul dummy, r16.x, r14.x
34(151) type3: (rpt1/syn)fmac r18.y, (r)r16.y, (r)r14.y
35(153) type3: (lock)fmul dummy, r16.x, r15.x
812 { 36(154) type3: (rpt1/syn)fmac r18.z, (r)r16.y, (r)r15.y
37(219) type0: (rpt2)nop
38(157) type3: (lock)fmul dummy, r18.x, r18.x
39(158) type3: (rpt1)fmac r20.x, (r)r18.y, (r)r18.y
40(222) type0: (rpt1)nop
41(224) type0: (rpt3)nop
42(160) type2: rsq r20.x, r20.x
43(162) type3: (rpt2/syn)fmul r18.x, r20.x, (r)r18.x
44(228) type0: (rpt2)nop
45(172) type3: (lock)fmul dummy, r21.x, r18.x
46(173) type3: (rpt1)fmac r22.x, (r)r21.y, (r)r18.y
47(187) type3: (lock)fmul dummy, c3.x, r18.x
48(188) type3: (rpt1)fmac (sat)r25.x, (r)c3.y, (r)r18.y
49(175) type3: fmul r22.x, c2.x, r22.x

Fig. 8C

```
50(231) type0:  (rpt1)nop
51(190) type4:  fmad r25.x, c4.x, r25.x, c4.y
52(177) type4:  (rpt2)fmad r22.x, r22.x, (r)r18.x, -(r)r21.x
53(233) type0:  (rpt2)nop
54(180) type3:  (lock)fmul dummy, r22.x, r22.x
55(181) type3:  (rpt1)fmac r24.x, (r)r22.y, (r)r22.y
56(236) type0:  (rpt1)nop
57(238) type0:  (rpt3)nop
58(183) type2:  rsq r24.x, r24.x
59(185) type3:  (rpt2/syn)fmul r22.x, r24.x, (r)r22.x
60(242) type0:  (rpt2)nop
61(192) type3:  (lock)fmul dummy, c3.x, r22.x
62(193) type3:  (rpt1)fmac (sat)r25.y, (r)c3.y, (r)r22.y
63(245) type0:  (rpt1)nop
64(247) type0:  (rpt3)nop
65(196) type2:  log r26.x, r25.y
66(197) type3:  (syn)fmul r26.x, c6.x, r26.x
67(251) type0:  (rpt1)nop
68(253) type0:  (rpt3)nop
69(198) type2:  exp r25.y, r26.x
70(200) type3:  (syn)fmul r25.y, c0.w, r25.y
71(257) type0:  (rpt2)nop
72(204) type4:  (rpt2/syn)fmad r27.x, (r)r27.x, r25.x, r25.y
73(260) type0:  (rpt1)nop
74(262) type0:  (rpt3)nop
75(209) type2:  sqrt r0.z, (r)r27.z
76(206) type2:  (rpt1)sqrt r0.x, (r)r27.x
77(266) type0:  (syn)nop
78(208) type0:  end
```

Fig. 8D

```
 0(125) type4: (syn)sample r16.XYZW, r3.xyyy, m1, s1
 1(202) type4: (syn)sample r27.XYZW, r2.xyyy, m0, s0
 2(91)  type2: (syn)rcp r9.w, r8.w
 3(132) type4: (syn)fmad r17.z, c1.y, r16.y, -c1.x
 4(134) type4: (syn)fmad r17.y, c1.y, r16.y, -c1.x
 5(136) type4: (syn)fmad r17.x, c1.y, r16.x, -c1.x
 6(93)  type3: (rpt2/syn)fmul r10.x, (r)r4.x, r9.w
 7(95)  type3: (rpt2/syn)fmul r11.x, (r)r5.x, r9.w
 8(97)  type3: (rpt2/syn)fmul r12.x, (r)r6.x, r9.w
 9(99)  type3: (rpt2/syn)fmul r13.x, (r)r7.x, r9.w
10(138) type2: (rpt2)fmov r16.x, (r)r17.x
11(118) type3: (lock)fmul dummy, r10.x, r10.x
12(119) type3: (rpt1)fmac r15.x, (r)r10.y, (r)r10.y
13(102) type3: (lock)fmul dummy, r11.x, r11.x
14(103) type3: (rpt1)fmac r9.x, (r)r11.y, (r)r11.y
15(110) type3: (lock)fmul dummy, r12.x, r12.x
16(111) type3: (rpt1)fmac r14.x, (r)r12.y, (r)r12.y
17(121) type2: rsq r15.x, r15.x
18(165) type3: (lock)fmul dummy, r13.x, r13.x
19(166) type3: (rpt1)fmac r21.x, (r)r13.y, (r)r13.y
20(105) type2: rsq r9.x, r9.x
21(140) type3: (lock)fmul dummy, r16.x, r16.x
22(141) type3: fmac r16.z, r16.y, r16.y
23(123) type3: (rpt2/syn)fmul r15.x, r15.x, (r)r10.x
24(113) type2: rsq r14.x, r14.x
25(107) type3: (rpt2/syn)fmul r9.x, r9.x, (r)r11.x
26(168) type2: rsq r21.x, r21.x
27(143) type3: fadd r16.z, -c1.x, r16.z
28(115) type3: (rpt2/syn)fmul r14.x, r14.x, (r)r12.x
29(170) type3: (rpt2/syn)fmul r21.x, r21.x, (r)r13.x
30(145) type2: sqrt r16.z, -r16.z
31(147) type3: (lock)fmul dummy, r16.x, r9.x
32(148) type3: (rpt1/syn)fmac r18.x, (r)r16.y, (r)r9.y
33(150) type3: (lock)fmul dummy, r16.x, r14.x
34(151) type3: (rpt1/syn)fmac r18.y, (r)r16.y, (r)r14.y
35(153) type3: (lock)fmul dummy, r16.x, r15.x
36(154) type3: (rpt1/syn)fmac r18.z, (r)r16.y, (r)r15.y
37(219) type0: nop
38(157) type3: (lock)fmul dummy, r18.x, r18.x
39(158) type3: (rpt1)fmac r20.x, (r)r18.y, (r)r18.y
40(220) type0: (rpt1)nop
41(222) type0: (rpt3)nop
42(160) type2: rsq r20.x, r20.x
43(162) type3: (rpt2/syn)fmul r18.x, r20.x, (r)r18.x
44(226) type0: nop
45(172) type3: (lock)fmul dummy, r21.x, r18.x
46(173) type3: (rpt1)fmac r22.x, (r)r21.y, (r)r18.y
47(187) type3: (lock)fmul dummy, c3.x, r18.x
48(188) type3: (rpt1)fmac (sat)r25.x, (r)c3.y, (r)r18.y
49(175) type3: fmul r22.x, c2.x, r22.x
```

```
50(227) type0: (rpt1)nop
51(190) type4: fmad r25.x, c4.x, r25.x, c4.y
52(177) type4: (rpt2)fmad r22.x, r22.x, (r)r18.x, -(r)r21.x
53(229) type0: nop
54(180) type3: (lock)fmul dummy, r22.x, r22.x
55(181) type3: (rpt1)fmac r24.x, (r)r22.y, (r)r22.y
56(230) type0: (rpt1)nop
57(232) type0: (rpt3)nop
58(183) type2: rsq r24.x, r24.x
59(185) type3: (rpt2/syn)fmul r22.x, r24.x, (r)r22.x
60(236) type0: nop
61(192) type3: (lock)fmul dummy, c3.x, r22.x
62(193) type3: (rpt1)fmac (sat)r25.y, (r)c3.y, (r)r22.y
63(237) type0: (rpt1)nop
64(239) type0: (rpt3)nop
65(196) type2: log r26.x, r25.y
66(197) type3: (syn)fmul r26.x, c6.x, r26.x
67(243) type0: (rpt1)nop
68(245) type0: (rpt3)nop
69(198) type2: exp r25.y, r26.x
70(200) type3: (syn)fmul r25.y, c0.w, r25.y
71(249) type0: (rpt2)nop
72(204) type4: (rpt2/syn)fmad r27.x, (r)r27.x, r25.x, r25.y
73(252) type0: (rpt3)nop
74(206) type2: (rpt1)sqrt r0.x, (r)r27.x
75(256) type0: (rpt1)nop
76(209) type2: sqrt r0.z, (r)r27.z
77(258) type0: (syn)nop
78(208) type0: end
```

Fig. 8F

SYSTEM AND METHOD FOR INSTRUCTION LATENCY REDUCTION IN GRAPHICS PROCESSING

TECHNICAL FIELD

This disclosure relates to reducing instruction latency in program code used in graphics processing, and more particularly to reducing instruction latency in shaders used in graphics processing.

BACKGROUND DISCUSSION

A graphics processing unit (GPU) is a dedicated graphics rendering device used to generate computerized graphics for display on a display device. A GPU is typically used with a general purpose central processing unit (CPU) to process graphic image data, e.g., three-dimensional computerized graphic image data. In such a case, a GPU can implement a number of primitive graphics operations to create three-dimensional images for display on a display device more quickly than using a CPU to draw the image for display on the display device. Typically, a GPU includes hardware that implements some number of the complex algorithms in hardware.

A typical GPU receives an image geometry and uses a pipeline approach to generate graphics which can be output, for example, for display on a display device. A typical graphics pipeline includes a number of stages which operate in parallel, with the output from one stage possibly being used at another stage in the pipeline. For example, a typical graphics pipeline comprises vertex shader, primitive assembly, viewport transformation, primitive setup, rasterization, hidden primitive and pixel rejection, attribute setup, attribute interpolation and fragment shader stages.

A vertex shader is applied to the image geometry for an image and generates vertex coordinates and attributes of vertices within the image geometry. Vertex attributes include, for example, color, normal, and texture coordinates associated with a vertex. Primitive assembly forms primitives, e.g., point, line, and triangle primitives, from the vertices based on the image geometry. Formed primitives can be transformed from one space to another using a transformation, e.g., a viewport transformation which transforms primitives from a normalized device space to a screen space. Primitive setup can be used to determine a primitive's area, edge coefficients, and perform occlusion culling (e.g., backface culling), and 3-D clipping operations.

Rasterization converts primitives into pixels based on the XY coordinates of vertices within the primitives and the number of pixels included in the primitives. Hidden primitive and pixel rejection use the z coordinate of the primitives and/or pixels to determine and reject those primitives and pixels determined to be hidden (e.g., a primitive or pixel located behind another primitive or pixel in the image frame, a transparent primitive or pixel). Attribute setup determines attribute gradients, e.g., a difference between the attribute value at a first pixel and the attribute value at a second pixel within a primitive moving in either a horizontal (X) direction or a vertical (Y) direction, for attributes associated with pixels within a primitive. Attribute interpolation interpolates the attributes over the pixels within a primitive based on the determined attribute gradient values. Interpolated attribute values are sent to the fragment shader for pixel rendering. Results of the fragment shader can be output to a post-processing block and a frame buffer for presentation of the processed image on the display device.

Shaders, e.g., vertex and fragment shaders, are typically computer programs that compute and control the attributes of primitives, e.g., vertices or pixels, used in graphics or other multi-media systems. Shaders are typically written in a programming language, such as a high-level or low-level programming language, for example. A high-level programming language can be the C++ programming language, and the like. An assembly language is an example of a low-level language.

A shader compiler acts as a translator that translates shader program code written in a high-level or low-level language into a machine-level language. In a case that the shader is written in a high-level language, the translator translates the shader program code from the high-level language in which it is written into a low-level language and then translates the low-level shader program code into machine-level instructions. An instruction scheduler of the shader compiler reorders the machine instructions of the shader in an effort to speed up shader execution. In addition, the shader compiler addresses time constraints of the hardware by inserting dummy instructions, e.g., no operations or NOPs, to make the shader conform to the timing constraints of the hardware that executes the shader.

It would be beneficial to be able to optimize a shader's instructions while taking into account hardware constraints.

SUMMARY

The present disclosure seeks to address failings in the art and to provide one or more methods, apparatuses and computer-readable media for use in optimizing scheduling of instructions to implement at least a portion of a graphics processing pipeline, e.g., a shader such as a vertex shader and/or a fragment shader.

In accordance with one or more embodiments, a dependence between two instructions in graphics processing instructions is identified, one of the two instructions comprising a predecessor instruction and another of the two instructions comprising a successor instruction. An initial edge latency associated with the dependence between the predecessor and successor instructions is determined. An instruction distance corresponding to the predecessor and successor instructions is determined, and is used to reduce the initial edge latency by the determined instruction distance to determine a reduced edge latency associated with the dependence between the predecessor and successor instructions. The graphics processing instructions can implement a shader, such as a vertex shader or a fragment shader, for example.

In accordance with one or more embodiments, a reduced edge latency determined by reducing an initial edge latency by a determined instruction distance is used to schedule execution of a successor instruction. In accordance with one or more embodiments a number of synchronizing instructions, e.g., an independent shader instruction or NOP, to be executed prior to commencing execution of the successor instruction is determined, so as to synchronize execution of the successor instruction with a predecessor instruction.

In accordance with one or more embodiments, an initial edge latency is a hardware latency associated with a predecessor instruction, and/or a dependence between the predecessor and successor instructions comprises a flow dependence, such that a destination of the predecessor instruction is a source of the successor instruction.

In accordance with one or more embodiments, a dependence between two instructions in graphics processing instructions is identified, one of the two instructions comprising a predecessor instruction and another of the two instructions comprising a successor instruction. An initial edge latency associated with the dependence between the predecessor and successor instructions is determined. An instruction distance corresponding to the predecessor and successor instructions is determined, and is used to reduce the initial edge latency by the determined instruction distance to determine a reduced edge latency associated with the dependence between the predecessor and successor instructions. The instruction distance is determined by determining a mask distance for each source operand of the successor instruction that corresponds to a destination operand of the predecessor instruction, and selecting a smallest mask distance from the determined mask distances as the instruction distance.

In accordance with one or more embodiments, a mask distance associated with a source operand and used in determining an instruction distance is determined by determining a component mask for the destination operand of the predecessor instruction and a component mask for the source operand of the successor instruction, generating a component string by concatenating the destination operand's component mask and the source operand's component mask, determining a component distance associated with each component in a component set using the component string, and identifying a smallest component distance of the determined component distances as the mask distance for the source operand.

In accordance with one or more embodiments, a component distance associated with each component in a component set is determined by examining the component string to locate a first occurrence of the component in the component string, in a case that a first occurrence of the component is located, examining the component string to locate a second occurrence of the component in the component string, the second occurrence being after the first occurrence in the component string, and in a case that a second occurrence of the component is located, determining a number of components between the first and second occurrences of the component in the component string, and setting the component distance for the component to the determined number of components.

In accordance with one or more embodiments, the graphics processing instructions implement a vertex shader, the component set comprises X, Y, Z and W components, and the component distance is determined for each one of the components X, Y, Z and W component in the component set. In accordance with one or more embodiments, the graphics processing instructions implement a fragment shader, the component set comprises R, G, B and A components, and the component distance is determined for each one of the components R, G, B and A component in the component set.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 4, which comprises

FIG. 7 provides an illustration of an instruction distance determination for predecessor and successor instruction examples in accordance with one or more embodiments of the present disclosure.

FIG. 8, which comprises FIGS. 8A to 8F, provides examples of instructions that implement a shader discussed in connection with one or more embodiments of the present disclosure.

DETAILED DESCRIPTION

Figure 1:
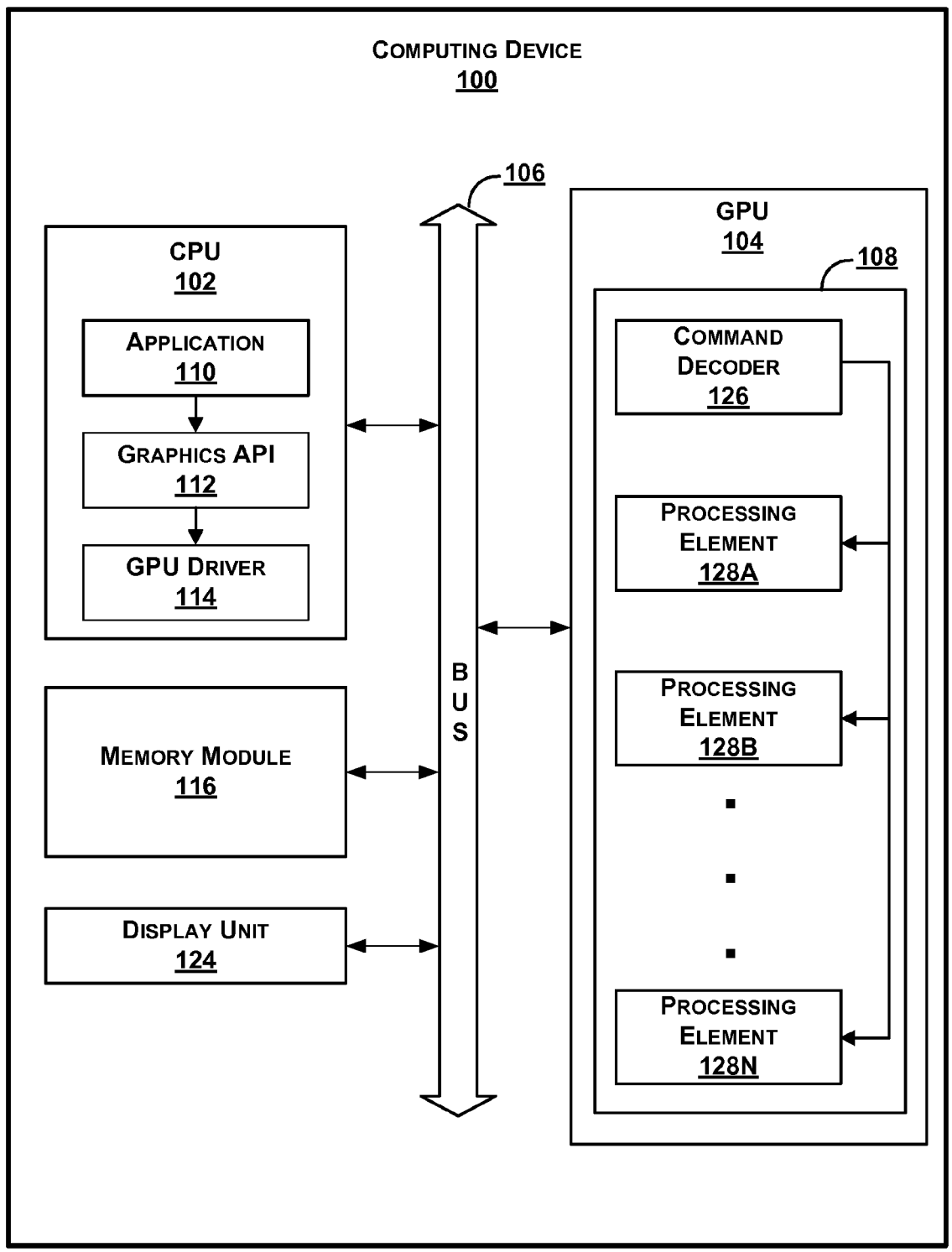
FIG. 1 is a block diagram illustrating an exemplary device for use in accordance with one or more embodiments of the present disclosure.

Certain embodiments of the present disclosure will now be discussed with reference to the aforementioned figures, wherein like reference numerals refer to like components.

In accordance with one or more embodiments, a system, method and apparatus are disclosed, in which an instruction scheduler of a compiler, e.g., a shader compiler, reduces instruction latency based on a determined instruction distance between dependent predecessor and successor instructions. In accordance with one or more embodiments of the present disclosure, a shader compiler comprises an instruction optimizer and instruction scheduler that addresses hardware timing constraints and minimizes schedule length, e.g., the number of instructions in an instruction/execution schedule. While instruction scheduling optimization is disclosed herein with reference to instructions that implement a shader, it should be apparent that embodiments of the present disclosure need not be limited to optimization of instructions that implement a shader. Embodiments of the present disclosure can be used to optimize scheduling of any instructions, computer program, program code, or program or program code segment. By way of a non-limiting example, one or more of the embodiments disclosed herein can be used with any programming language that supports native vectors that consist of multiple components, e.g., two, three, or four components, and any program or program segment that is defined using such a programming language.

FIG. 1 is a block diagram illustrating an exemplary computing device 100 that includes a graphics processing unit (GPU) 104 for use in accordance with one or more embodiments of the present disclosure. Computing device 100 may comprise a personal computer, a desktop computer, a laptop computer, a workstation, a video game platform or console, a cellular or satellite radiotelephone, a landline telephone, an Internet telephone, a handheld device such as a portable video game device or a personal digital assistant, a personal music player, a server, an intermediate network device, a mainframe computer, or another type of device that outputs graphical information.

In the example of FIG. 1, computing device 100 includes a central processing unit (CPU) 102, GPU 104, and a memory module 116, e.g., a random access memory (RAM) memory module or modules. CPU 102, GPU 104, and memory module 116 communicate using a bus 106, which can comprise any type of bus or device interconnect now known or later discovered. CPU 102 can comprise a general purpose or a special purpose microprocessor. For example, CPU 102 may comprise a Core 2 Processor provided by Intel Corporation of Santa Clara, Calif. or another type of microprocessor. GPU 104 is a dedicated graphics rendering device. GPU 104 can be integrated into the motherboard of computing device 100, can be present on a graphics card that is installed in a port in the motherboard of computing device 100, or can be otherwise configured to interoperate with computing device 100, for example.

Display unit 124, which is coupled to computing device 100, can comprise a monitor, a television, a projection device, a liquid crystal display, a plasma display panel, a light emitting diode (LED) array, a cathode ray tube display, electronic paper, a surface-conduction electron-emitted display (SED), a laser television display, a nanocrystal display, or another type of display unit, for example. In the example of FIG. 1, display unit 124 can be a part of computing device 100. For instance, display unit 124 can be a screen of a mobile telephone. Alternatively, display unit 124 can be external to computer device 100 and can be in communication with computing device 100 via a wired or wireless communications connection or other connection, for example. By way of a non-limiting example, display unit 124 can be a computer monitor or flat panel display connected to a personal computer via a wired or wireless connection.

A software application 110 can be executed via CPU 102. Software application 110 can comprise any software application capable of executing via CPU 102, such as a video game, a graphical user interface engine, a computer-aided design program for engineering or artistic applications, or another type of software application that uses two-dimensional (2D) or three-dimensional (3D) graphics, by way of non-limiting examples.

When CPU 102 is executing software application 110, software application 110 can invoke subroutines of a graphics processing application programming interface (API) 112, such as any one or more of an OpenVG API, an OpenGL API, a Direct3D API, a Graphics Device Interface (GDI), Quartz, QuickDraw, or another type of 2D or 3D graphics processing API, by way of non-limiting examples.

In accordance with at least one embodiment, when software application 110 invokes a subroutine of graphics processing API 112, graphics processing API 112 invokes one or more subroutines of a GPU driver 114, which execute via CPU 102 on computing device 100. GPU driver 114 can comprise a set of software and/or firmware instructions that provide an interface between graphics processing API 112 and GPU 104, for example. When graphics processing API 112 invokes a subroutine of GPU driver 114, GPU driver 114 formulates and issues a command that causes GPU 104 to generate displayable graphics information. A shader compiler in accordance with one or more embodiments disclosed herein can be a component, e.g., a software module, of GPU driver 114. GPU driver 114 uses the shader compiler to translate a shader program into machine-level instructions and communicate the instructions to GPU 104. For example, when graphics processing API 112 invokes a subroutine of GPU driver 114 to render a batch of graphics primitives, GPU driver 114 provides GPU 104 with a processing configuration, which GPU 104 uses to render the batch of graphics primitives. GPU 104 renders the batch of graphics primitives, and outputs a raster image of the graphics primitives, for example.

A command formulated by GPU driver 114 can identify graphics processing configuration(s) that GPU 104 is to use to perform the command, which configuration(s) can identify a set of instructions to be executed by GPU 104, a set of state register values, and other types of information that GPU 104 might need to perform the command.

In a case that GPU driver 114 stores the graphics processing configuration(s) in memory 116, GPU driver 114 can reference the storage locations in memory module 116 corresponding to the graphics processing configuration(s) in the command formulated by GPU driver 114. When GPU 104 receives the command, GPU 104 can retrieve from memory 116 the graphics processing configuration(s) referenced in the command received from GPU driver 114.

In accordance with at least one embodiment, command decoder 126 of GPU 104 decodes the command from GPU driver 114 and configures one or more of processing elements 128 to perform the command. By way of a non-limiting example, command decoder 126 retrieves the graphics processing configuration(s) from memory 116, and loads a set of instructions identified by the graphics processing configuration(s) into processing element(s) 128. Command decoder 126 can also be configured to provide input data to one or more processing elements 128.

In accordance with one or more embodiments, processing elements 128 implement a graphics pipeline 108. In accordance with such embodiments, processing elements 128 can implement graphics pipeline 108 in a parallel mode. In a parallel mode, processing elements 128 can operate on data in parallel, with output from processing element 128 being used as input to another processing element 128. By way of a non-limiting example, processing element 128A performs a first graphics operation on a first set of initial input data received from command decoder 126 and outputs a first set of intermediate results to processing element 128B. The initial input data can comprise data corresponding to one or more vertices, which data can comprise coordinate and attribute data, for example. Vertex coordinates identify a location within an image based on, for example, a four-dimensional coordinate system with X, Y, and Z (width, height, and depth) coordinates, and a W coordinate that comprises a perspective parameter. Vertex attributes can include color, normal, and texture coordinates associated with a vertex, for example. Processing element 128B can perform another graphics operation on the first set of intermediate results output by processing element 128A, and output a second set of intermediate results to another of the processing element 128, and so on. While processing element 128B is performing the second graphics operation, processing element 128A can be performing the first graphics operation on a second set of initial input data received from command decoder 126.

Processing elements 128 can continue in this manner until processing element 128N outputs a pixel object to one or more buffers in memory module 116, or output this new pixel object to some other destination. A pixel object is data that describes a pixel. Each pixel object may specify multiple color values, and can specify a transparency level of the pixel. In some circumstances, a pixel object may specify a first color in a first color format and a second color in a second color format.

In accordance with one or more embodiments of the disclosure, one of processing elements 128 comprises a programmable processing element that can be configured as a vertex shader unit that performs one or more vertex shading operations, each of which operate on vertex data, e.g., X, Y, Z and W component data. Similarly, the same or another one of the processing elements 128 comprises a programmable processing element that can be configured as a fragment shader that performs one or more fragment shading operations, each of which operate on pixel data, e.g., R, G and B component data.

Figure 2:
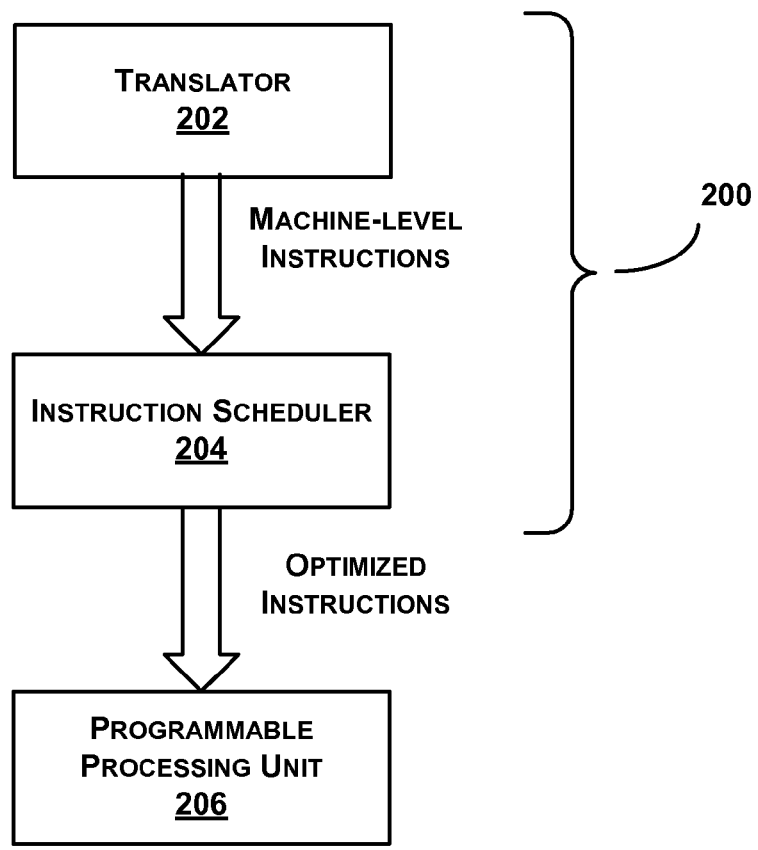
FIG. 2 provides an exemplary block diagram of a shader compiler in accordance with one or more embodiments of the present disclosure.

In accordance with one or more embodiments of the present disclosure, a compiler generates program code that includes instructions that are to be executed by the programmable processing element to perform shader operations, e.g., vertex shader or fragment shader operations. FIG. 2 provides an example of a compiler that compiles program code, e.g., shader program code. The compiler 200 comprises at least one translator 202. Translator 202 translates the shader program code, which includes a set of instructions written in either a high-level programming language or an assembly language, into machine-level instructions recognizable by the programmable processing element 206. Instruction scheduler 204 of compiler 200 schedules the instructions for execution by the programmable processing element 206.

An input list comprising a group of machine-level, or machine-executable, instructions that are to be scheduled is input to the instruction scheduler 204. Instructions in an input list that do not depend on, or conflict with, any other instructions are moved from the input list to a ready list. The ready list stores all instructions that are ready to be scheduled for execution. An instruction is moved from the ready list to an active list when it is scheduled. An active list stores instructions that are currently being executed. An instruction is moved from the active list to a result list when it completes execution. A result list stores instructions that have been scheduled and have completed execution. A result list comprises an output of an instruction scheduler.

Gating conditions that control when instructions are moved from one list to another are calculated using a dependence graph, which identifies static latencies. By way of a non-limiting example, a dependence exists between two instructions, I1 and I2, if one instruction, I2, relies on the result of the other instruction, I1, or a resource conflict exists between the two instructions. If a dependence exists between the two instructions and instruction I1 precedes I2, instruction I1 is considered to be a predecessor instruction and instruction I2 is a successor instruction. A dependence graph can be used to designate a dependency between the two instructions.

Figure 3:
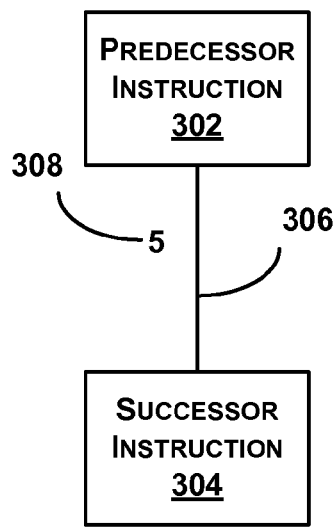
FIG. 3 provides an example of a dependency graph for use in accordance with one or more embodiments of the present disclosure.

FIG. 3 provides an example of a dependence graph, or subset thereof, which indicates that a dependence exists between a predecessor instruction and a successor instruction. An edge 306 in the dependence graph can be used to signify the dependence. A weight 308 can be associated with the edge 306, to represent the number, or count, of instruction-execution cycles needed to resolve the dependence. The weight is referred to as an edge latency. Edge latency is initially calculated as a static latency using the input list. e.g., a hardware latency associated with a predecessor instruction. A dynamic latency is a time span, e.g., measured in instruction/execution cycles, that instructions have been in the active list.

A predecessor instruction, P1, can have a number n of successor instructions, S1 . . . Sn, where n can be greater than or equal to zero. Each successor instruction, S, can have a number n of predecessor instructions, P1 . . . Pn, which include predecessor instruction, P1.

When a successor instruction's dynamic latency is greater than or equal to one of its static, or edge, latencies, the successor instruction can be removed from the predecessor instruction's successor list and the predecessor instruction can be removed from the successor's predecessor list. As time progresses, e.g., execution cycles occur, and dynamic latencies increase, more successor and predecessor instructions can be removed. An instruction that is on the active list is complete when all of its successors are removed from the successor list, and an instruction on the input list is ready to be executed when all of its predecessors are removed. It is therefore beneficial to be able to minimize static edge latencies, e.g., to accelerate a timing of execution of a successor instruction. Advantageously, a reduction in edge latencies identified using one or more embodiments of the present disclosure improves schedule quality and results in more compact code.

A programming language in which a shader is written can include special language constructs to satisfy special graphics and multimedia needs. The special shader programming languages and the general-purpose programming languages, e.g., C++ and the like, support similar data types, arrays, structs, statements, and functions. While shader programming languages may not be as flexible as general-purpose languages and may have some limitations on some general features, shader programming languages have some additional features that are not supported in general-purpose languages. For example, shader languages can provide support for native vectors that consist of multiple components, e.g., two, three, or four components. General-purpose programming languages usually do not have native support for such vectors.

Typical primitives used in shaders comprise colors and vertices, e.g., vectors such as red, green, blue (R, G, B) or (X, Y, Z, W). Use of multiple-component vectors makes shader compilers more complex than compilers that compile general-purpose language. Embodiments of the present disclosure use the extra information to reduce latency, and to improve instruction scheduling. In accordance with one or more such embodiments, the features of the shader programming languages involving vectors and their attributes are analyzed to reduce edge latencies, such that a timing of execution of an instruction awaiting execution can be reduced, scheduling can be improved, and code can be more compact, for example.

There are a number of types of dependencies between instructions. A flow, or true, dependency exists between two instructions, I1 and I2, where I2 uses the output of I1. A true dependency can be determined by examining the register numbers and component indices referenced by the two instructions. By way of a non-limiting example, instruction I2 is a successor of instruction I1, and uses as at least one of its source operands a register and component, e.g., X component, output by instruction I1.

An output dependence exists between instructions I1 and I2 in a case that both instructions output to the same register. By way of a non-limiting example, instructions I1 and I2 output to register R0. A control dependency exists between instructions I1 and I2 in a case that the execution flow is determined by the outcome of a logical operation, e.g., if-else conditional. An anti-dependence exists between instructions I1 and I2 in a case that the output of instruction I2 uses the same register as the input of instruction I1.

In accordance with one or more embodiments, an initial edge latency can be determined based on a hardware latency associated with the predecessor instruction. In a case that instructions I1 and I2 are dependent and the dependence is a true dependence, the full hardware latency can be used as the initial edge latency, which can be reduced by a determined instruction distance. In accordance with one or more such embodiments, additional analysis is performed to determine whether or not the edge latency initially determined to be the hardware latency of the predecessor instruction can be reduced by the determined instruction distance. Embodiments of the present disclosure address can be used to set an edge latency in cases other than a case in which the flow dependence and a fixed hardware latency exists. For example, if a false dependence exists, such as anti-dependence or an output dependence, edge latency can be set to one, in accordance with one or more embodiments.

A hardware latency is typically identified by hardware designers of the programmable, or other processing, unit that executes the instruction. The hardware latencies can be provided as part of a latency table that identifies the hardware latency for each of the instructions available for execution by the programmable unit. The following provides a formal equation for determining a hardware latency:

HARDWARE_LATENCY($I1,I2$)=latency provided by hardware designers for scalar instructions $I1$ and $I2$.

The following provides examples of the above equation where the scalar instructions I1 and I2 are both ADD, and where I1 is an ADD instruction and I2 is a BRANCH instruction.

HARDWARE_LATENCY(ADD,ADD)=6

HARDWARE_LATENCY(ADD,BRANCH)=10

The following provides a non-limiting example of an instruction syntax used herein. In this example, it is assumed that a flow dependence exists between instructions I1 and I2, such that n is the same value for both instructions I1 and I2, and that I1 defines at least one component used in instruction I2.

I1: (*i) def Rn.c
I2: (*j) use Rn.d

Instruction I1 above defines register Rn with component index c and the instruction repeats (i+1) times. Instruction I2 uses register Rn with component index d and the instruction repeats (j+1) times. The component index can point to one or more of X, Y, Z or W, for example. As part of this non-limiting example, it is assumed that the operand component index increments each time one or the other of the instructions repeats. Vector forms of the above instructions can be used to determine the dependence(cies) between the two instructions. The following provides vector forms resulting from a transformation of the above scalar instructions:

I1: defRn.mask1
I2: use Rn.mask2

Mask1 and mask2 identify the components pointed to by the respective component index of instruction I1 and I2. Since both instruction I1 and I2 operate on register n, an examination of the component masks, mask1 and mask2, can determine whether or not instruction I2 depends on instruction I1. Component masks can contain one or multiple components. Examples of components include without limitation RGB and XYZW. Examples of components masks include without limitation XYZW, YZWX, XY, Z. If mask1 and mask2 overlap in the sense that they share at least one component, there is dependence. If there is true or flow dependence, the full machine latency is used as the initial edge latency. The initial edge latency of a dependence edge from I1 to I2 is:

INITIAL LATENCY($I1,I2$)=HARDWARE LATENCY($I1,I2$)  Eq. 1

In accordance with one or more embodiments, Equation 1 identifies an initial edge latency, which can be reduced by a determined distance, an instruction distance, between two dependent instructions, as illustrated in Equation 2 formalized below:

EDGE LATENCY($I1,I2$)=HARDWARE LATENCY ($I1,I2$)−INSTRUCTION DISTANCE  Eq. 2

In accordance with one or more embodiments, instruction distance can be determined using a component mask, component string, component distance, and component mask distance. A component mask is a mask constructed from operands of a compressed scalar instruction. A compressed scalar instruction can repeat itself by incrementing component indices or keeping the indices. The following provides an example of a compressed scalar instruction:

(*2) ADD R0.X, (*)R1.Y, R2.X, where the 2 following the * indicates that the instruction is repeated twice after an initial execution of the instruction, i.e., the instruction is executed a total of three times. The * associated with the first and second operands, R0 and R1 indicate that the component indices corresponding to the two operands is to be incremented after the first and second executions of the instruction. In the example, the instruction is performed an initial time and is repeated twice. The compressed scalar instruction is an equivalent of the next three uncompressed scalar instructions:

E1: ADD R0.X, R1.Y, R2.X
E2: ADD R0.Y, R1.Z, R2.X
E3: ADD R0.Z, R1.W, R2.X

The first execution, E1, of the uncompressed instruction uses registers R0, R1 and R2, and the X, Y and X components, respectively. The execution E1 of the uncompressed instruction results in the X and Y component values associated with the R1 and R2 registers being added and the result being stored in the X component associated with register R0. The component indices associated with the R0 and R1 registers are incremented, as indicated by the * associated with each of R0 and R1 registers. In the second execution, E2, of the uncompressed instruction, the components associated with the R0 and R1 registers are the Y and Z components, respectively. The component associated with the R2 register is unchanged, i.e., the X component. The second execution E2 adds the Z and X component values associated with the R1 and R2 registers and the result is stored in the Y component associated with the R0 register. After incrementing the component indices associated with the R0 and R1 registers, such that the components associated with the R0 and R1 registers are Z and W (respectively), the third execution, E2, of the uncompressed instruction adds the W and X component values associated with registers R1 and R2 and stores the result in the Z component associated with the R0 register.

The component masks for each of the registers R0, R1, and R2 are XYZ, YZW, and X, respectively. To further illustrate, the component mask for the R0 register is formed using the components of the R0 register used in each execution, E1 to E3, of the uncompressed scalar instruction, i.e., X, Y and Z, respectively. Similarly, the component mask associated with the R1 register is formed from the Y, Z and W components used in instruction executions E1 to E3, and the component mask associated with the R2 register is formed from use of the register's X component in all three of the instruction executions E1 to E3.

In accordance with one or more embodiments, unlike swizzle masks used in vector instructions, a mask constructed from scalar instructions having duplicate components in the mask is an invalid component mask. For example and in accordance with such embodiments, XXY is a valid swizzle mask, but it is not a valid component mask.

A component string is generated by concatenating component masks, e.g., two component masks from predecessor and successor instructions. For example the concatenation of component masks XYZW and XY forms a component string XYZWXY. A component distance, COMPONENT_DIST(C, S), where C represents a component, e.g., one of X, Y, Z or W, and S represents the component string, can be defined to be the number of component occurrences, other than component C, between two occurrences of component C in component string S. The distance is positive infinity, +INF if there is no or one occurrence of the component C in the component string S.

The following provides examples of component distance calculations using component string XYZWXY, as S, and components X, Y, Z and W, as C:

COMPONENT_DIST(X,XYZWXY)=3

COMPONENT_DIST(Y,XYZWXY)=3

COMPONENT_DIST(Z,XYZWXY)=+INF

COMPONENT_DIST(W,XYZWXY)=+INF

In the first component distance determination using component X, there are two occurrences of X and three components YZW exist, or occur, between the two occurrences of X in the component string. In the second component distance determination using component Y, there are three components, YZW, that occur between occurrences of Y. In the next two component distance determinations involving Z and W, there is only one occurrence of both of these components in the component string. The component distance is therefore set to +INF.

A component mask distance can be determined to be the smallest component distance of the component distances determined using the component string formed by concatenating component masks M1 and M2. The following Equation 3 provides a formalization of a component mask distance determination in accordance with one or more embodiments:

MASK_DIST(M1,M2)=smallest(COMP_DIST(X,M),COMP_DIST(Y,M),COMP_DIST(Z,M),COMP_DIST(W,M)), where $M$ is the concatenation of $M1$ and $M2$. Eq. 3

For example:
MASK_DIST(XYZW, XY)=3, since the concatenation of the component masks XYZW and XY is XYZWXY and the component distance of X, Y, Z and W is 3, 3, +INF and +INF, respectively.
MASK_DIST(YZWX, XY)=0, since the concatenation of the component masks YZWX and XY is YZWXXY, and the component distance of X, Y, Z and W is 0, 4, +INF and +INF, respectively.

An operand distance can be defined to be a component mask distance determined using the masks associated with a source operand and a destination operand that use the same register, e.g., the destination operand used in a predecessor and a source operand in a successor instruction. The operand distance is the mask distance determined using Equation 3. For example, M is equal to the concatenation of the component mask associated with the operand in the predecessor instruction and the component mask associated with the operand in the successor instruction.

In accordance with one or more embodiments, an instruction distance is defined to be the smallest mask distance, or operand distance, of the mask distances of operands, e.g., each operand that is shared between two dependent instructions. There can be one or multiple source operands in the successor instruction that use the same register that is defined by the predecessor instruction. In a case that there are multiple source operands using the same register, multiple mask distances can be calculated and the smallest one is chosen as the distance between the two instructions. In accordance with one or more embodiments, an instruction distance between two dependent instructions, I1 and I2, with I1 being the predecessor instruction and I2 being the successor instruction, can be formalized as follows:

INSTR_DIST(I1,I2)=smallest(MASK_DIST(MD, MS1), Eq. 4

MASK_DIST(MD, MSn)), where MD is the component mask of I1's destination operand, MSi is the i-th source operand of I2 that uses the destination of I1, and n is the total number of I2 sources that use I1 destination.

For example, the instruction distance between the following two instructions is 1.
I1: ADD R1.XYZ, R2.XYZ, R3.XYZ
I2: MUL R4.X, R1.X, R1.Y The determined instruction distances between the output/destination of I1, R1.XYZ, and the first and second input/sources of I2 are 2 and 1 respectively. Thus the distance between I1 and I2 in the above sample instructions can be expressed as follows:

INSTR_DIST(I1,I2)=1

As discussed above, embodiments of the present disclosure reduce an initial edge latency by the instruction distance. The following Equation 5 provides a formalization of an edge latency determination used in accordance with one or more embodiments:

EDGE_LATENCY(I1,I2)=max(1,HARDWARE_LATENCY(I1,I2)−INSTR_DIST(I1,I2)) Eq. 5

A programmable shader unit supports a number of instruction types, including without limitation ALU, ELU, FLOW, and MEM. ALU instructions comprise arithmetic and logical instructions such as without limitation ADD, MUL, and MOV. ELU instructions comprise elementary function instructions such as without limitation EXP, LOG, and COS. FLOW instructions comprise control flow instructions such as without limitation JUMP and BRANCH. MEM instructions comprise memory-oriented instructions such as without limitation SAMPLE and LOAD. Some types have deterministic hardware latencies such as without limitation ALU. Other instruction types have nondeterministic hardware latencies such as without limitation MEM. An instruction set typically supports a synchronization mechanism, e.g., using a WAIT operation, for nondeterministic latencies.

For any two instructions I1 and I2 that have a dependent relationship and I1 precedes I2, one or more embodiments of the present disclosure define edge latencies as follows:

EDGE_LATENCY(I1,I2)=1 if a false dependence such as without limitation an anti-dependence or output dependence. Eq. 6

EDGE_LATENCY(I1,I2)=1 if the dependence is flow dependence and $I1$ has a nondeterministic latency. Eq. 7

EDGE_LATENCY(I1,I2)=max(1,HARDWARE_LATENCY (I1,I2)−INSTR_DIST(I1,I2)) if the dependence is flow dependence and $I1$ has a fixed/deterministic latency. Eq. 8

EDGE_LATECNY(I1,I2)=HARDWARE_LATENCY(I1,I2), Eq. 9 if the dependence is control dependence rather than data dependence.

The following provides examples illustrating a use of the above edge latency formalizations. For the sake of the example and for purposes of illustration, the ALU-type instructions are considered have a fixed latency of 5 and an instruction distance of 2, the ELU-type instructions have a nondeterministic latency, and FLOW-type instructions have a latency of 1. Using the exemplary latencies and instruction distance, the following edge latencies are determined using the above formalizations.

EDGE_LATENCY(*ALU,ALU*)=3

EDGE_LATENCY(*ALU,ELU*)=3

EDGE_LATENCY(*ALU*,FLOW)=3

EDGE_LATENCY(*ALU,MEM*)=3

In the above examples, it is assumed that there is a flow dependence between the two instructions, and that Equation 8 therefore applies. In each example, instruction I1 is an ALU-type instruction that has a fixed latency of 5 and an instruction distance of 2. Assuming that a flow dependence exists between the two instructions I1 and I2, Equation 8 is used to determine the edge latency. The initial edge latency of the ALU instruction, which corresponds to the ALU-type instruction's hardware/fixed latency of 5, which is reduced by the instruction distance between the two instructions of 2, or 5−2=3.

Figure 4A:
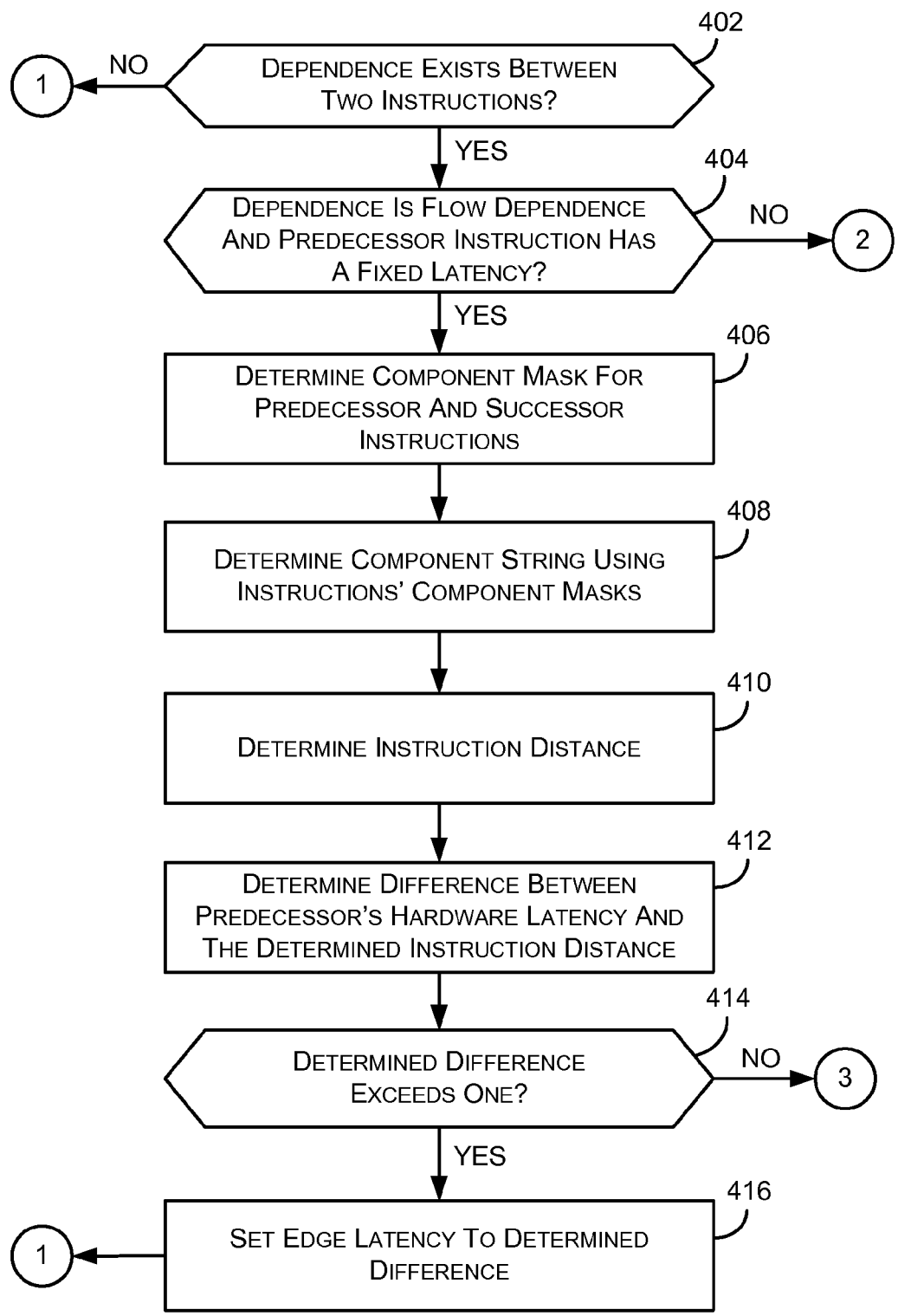
FIGS. 4A and 4B, illustrates an edge latency determination process flow performed by an instruction scheduler module in accordance with one or more embodiments of the present disclosure.
Figure 4B:
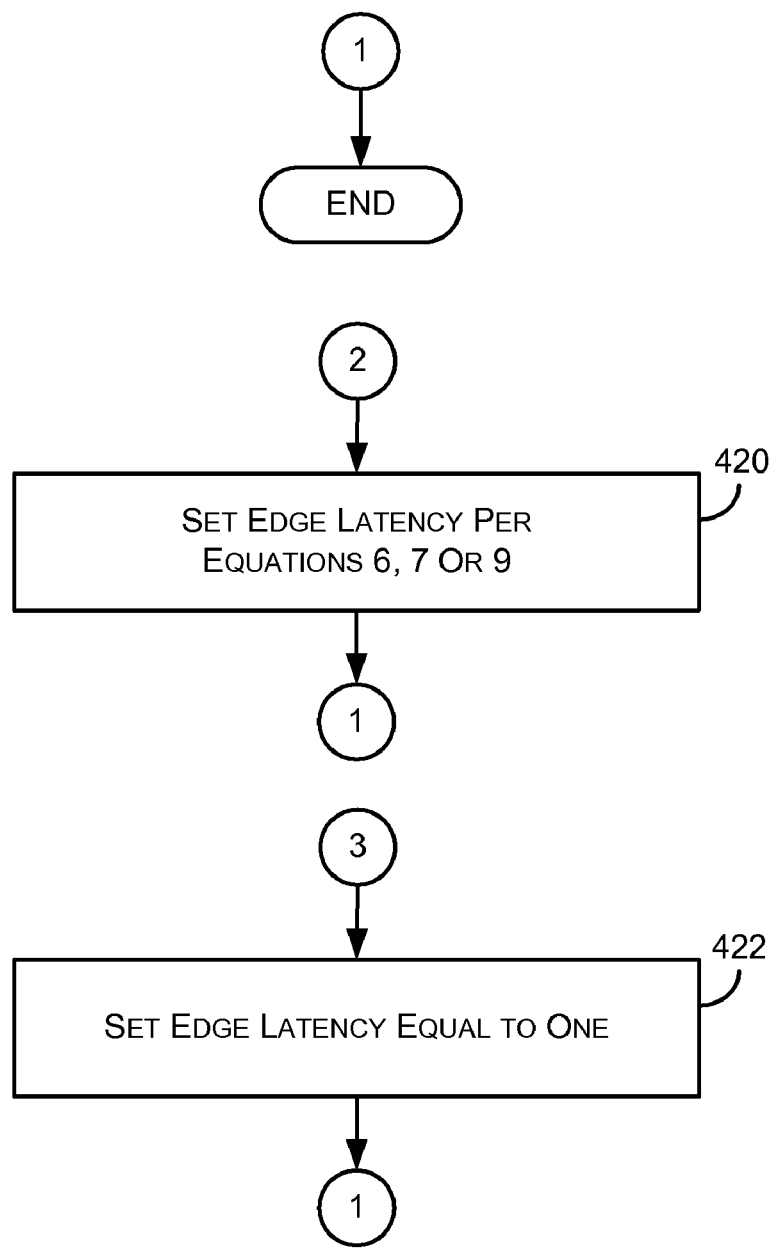

FIG. 4, which comprises FIGS. 4A and 4B, illustrates an edge latency determination process flow performed by an instruction scheduler module in accordance with one or more embodiments of the present disclosure. Embodiments of the present disclosure repeat the process for each pair of instructions, I1 and I2, in an input list provided to the instruction scheduler 204, where one of the instructions in the pair, e.g., I2, is dependent on the other, e.g., I1.

At step 402, a determination is made whether or not a dependence exists between two instructions, I1 and I2. If there is no dependence, the process ends for the current instruction pair, and can performed for a next pair of instructions until there are no more instructions to be examined. If it is determined that a dependence exists between the two instructions, processing continues at step 404 to determine whether the dependence is a flow dependence and the predecessor instruction, e.g., I1, has a fixed latency. If not processing continues at step 420 of FIG. 4B to set the edge latency associated with the two dependent instructions per Equation 6, 7 or 9, and processing for the instruction pair ends.

If it is determined at step 404 that a flow dependence exists between the two dependent instructions and the predecessor instruction has a fixed latency, processing continues at step 406 to determine at least one component mask for the predecessor and successor instructions. At step 408, a component string is determined at step 406 using the component masks determined for the predecessor and successor instructions. Processing continues at step 410 to determine the instruction distance using the component string determined at step 408.

Figure 5:
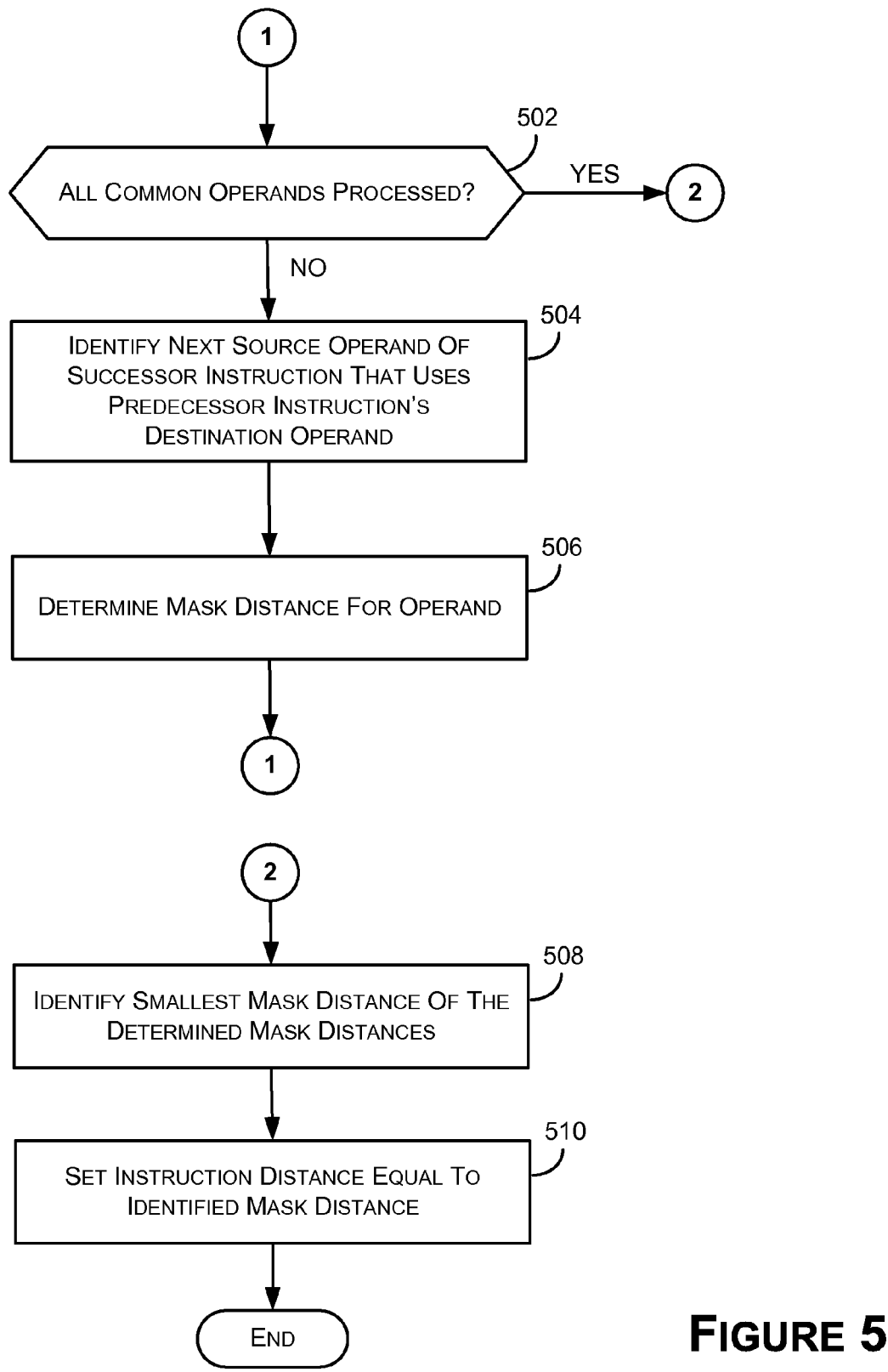
FIG. 5 illustrates an instruction distance determination process flow in accordance with one or more embodiments of the present disclosure.

FIG. 5 illustrates an instruction distance determination process flow in accordance with one or more embodiments of the present disclosure. Briefly and in accordance with one or more embodiments, an instruction distance is determined by examining the common operands, e.g., registers, of the predecessor and successor instructions to identify a mask distance for each common operand. In a case of a flow dependence between the predecessor and successor instructions, a source operand of the successor instruction uses a destination operand of the predecessor instruction. The mask distances identified for each of the common operands are then examined to identify the common operand with the smallest mask distance. The instruction distance is set equal to the smallest of the mask distances associated with the common operands.

More particularly, a determination is made at step 502 whether or not any of the operands that are shared by the predecessor and successor instructions remain to be processed. If so, processing continues at step 504 to identify the next operand shared by the predecessor and successor instructions, e.g., a register used by the predecessor instruction to store output and used by the successor instruction as input. At step 506, a mask distance is determined for the common operand.

Figure 6:
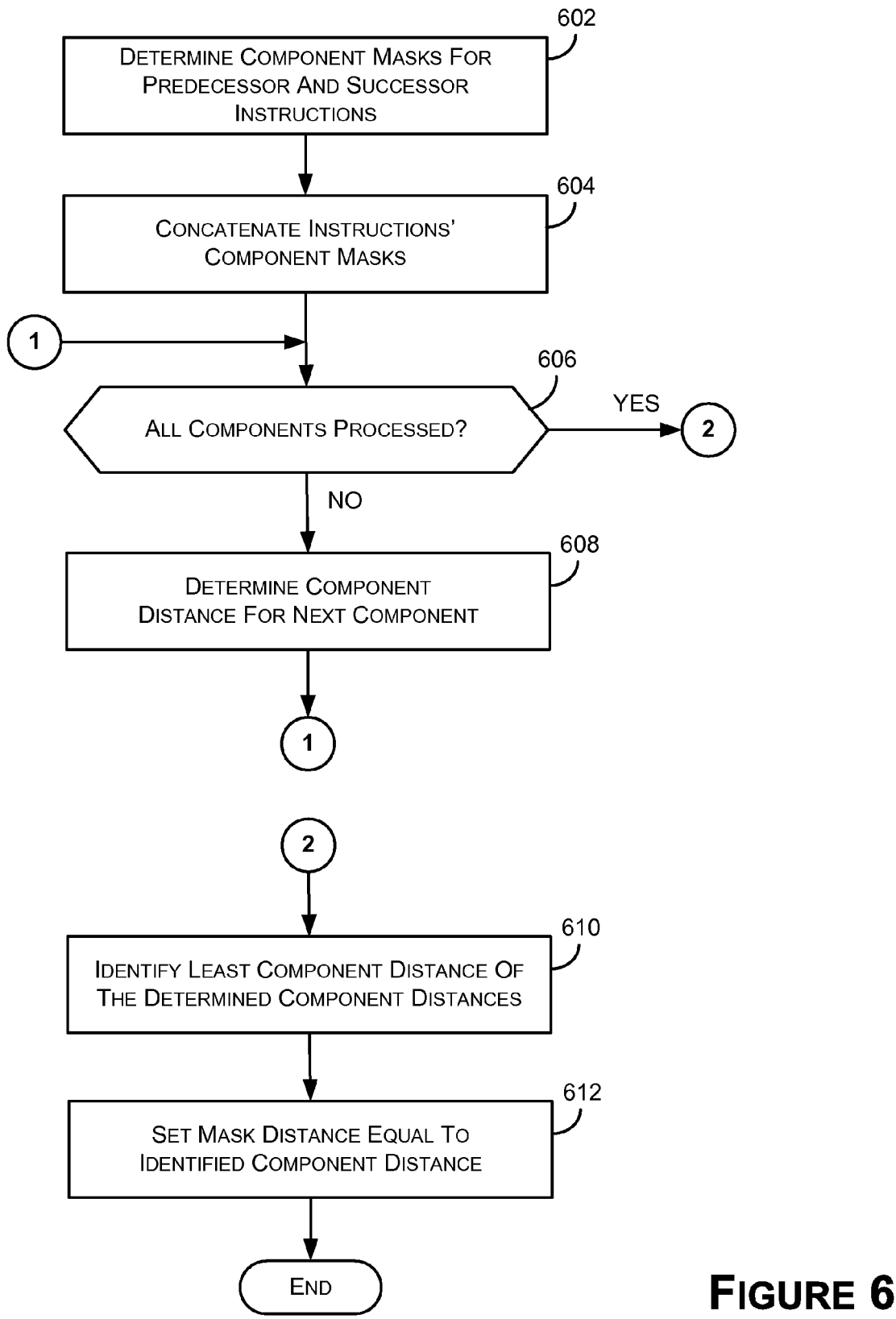
FIG. 6 illustrates a mask distance determination process flow in accordance with one or more embodiments of the present disclosure.

FIG. 6 illustrates a mask distance determination process flow for use in accordance with one or more embodiments of the present disclosure. Briefly and in accordance with one or more embodiments, a component mask, which comprises the components associated with a register that is the destination in the predecessor instruction, and a component mask, which comprises the components associated with the same register used as the source in the successor instruction, are determined. The determined component masks are concatenated to generate a component string, and component distances are determined using the component string. The smallest of the determined component distances is used as the mask distance.

FIG. 7 provides an illustration of an instruction distance determination for predecessor and successor instruction examples in accordance with one or more embodiments of the present disclosure. The predecessor instruction, I1, and successor instruction, I2, are shown at 702 of FIG. 7. Register R1 is both the destination operand of instruction I1 and a source operand of instruction I2. In fact, register R1 is the source of two of the operands of instruction I2. The steps of FIG. 6 are performed for each of the source component masks, MS1 and MS2, such that two mask distances are determined, one for each of the source operands in instruction I2 that uses register R1. As shown in Table 704, the component mask, MD, corresponding to the destination operand of instruction I1, is equal to XYZ, and the component masks corresponding to the two source operands of instruction I2, MS1 and MS2, are X and Y, respectively.

With respect to the first source operand of instruction I2, at step 602, the component masks are MD and MS1, e.g., the component mask of the predecessor instruction I1 and successor instruction I2, respectively. At step 604, MD and MS1 are concatenated to yield XYZX. Components X, Y, Z and W are compared to the concatenated string XYZW in steps 606 and 608 to determine a component distance for each component. Table 708 shows the component distance for each component determined using steps 606 and 608.

With respect to the second source operand of instruction I2, at step 602, the component masks are MD and MS2, e.g., the component mask of the predecessor instruction I1 and successor instruction I2, respectively. As shown in Table 704, MD is equal to XYZ and MS2 is equal to Y. At step 604, MD and MS2 are concatenated to yield XYZY. Components X, Y, Z and W are compared to the concatenated string XYZY in steps 606 and 608 to determine a component distance for each component. Table 712 shows the component distance for each component determined using steps 606 and 608.

If it is determined at step 606 that all of the components are processed to determine a component distance, processing continues at step 610 to determine a mask distance from the determined component distances. More particularly, at step 610, the smallest component distance of the determined component distances is identified, and the smallest component distance identified in step 610 is used to set the mask distance at step 612.

For example and with reference to FIG. 7 and Table 708, the smallest component distance determined for MD and MS1 is equal to 2. As shown in equation 706, the mask distance of MD and MS1 is set to 2. By way of a further non-limiting example, as shown in equation 710, the mask distance of MD and MS2 is equal to 1, i.e., the smallest component distance shown in Table 714.

Referring again to FIG. 5, if it is determined at step 502 that all of the operands shared between the predecessor and successor instructions have been processed, processing continues at step 508 to determine an instruction distance. More particularly, at step 508, the smallest mask distance of the determined mask distances is identified. By way of a non-limiting example and with reference to equations 706 and 710 of FIG. 7, the mask distance that corresponds to the second source operand of successor instruction I2 is smaller than the mask distance that corresponds to the first source operand of the successor instruction I2. At step 510 of FIG. 5, the smallest mask distance identified in step 508 is used to set the instruction distance. In the example shown in FIG. 7, the instruction distance is set to 1 at step 510.

Referring again to FIG. 4, a difference between a predecessor instruction's hardware latency and a determined instruction distance is determined at step 412. A determination is made at step 414 whether or not the determined difference exceeds one. If not, processing continues at step 422 to set the edge latency to one, and processing ends for the current instruction pair. If it is determined, at step 414, that the determined difference exceeds one, processing continues at step 416 to set the edge latency between the two dependent instructions to the difference between the predecessor instruction's hardware latency and the determined instruction distance.

As shown in the example process flow of FIG. 4, embodiments of the present disclosure set an edge latency equal to one in a case that the dependence between the predecessor and successor instructions is other than flow dependence or the predecessor instruction does not have a fixed hardware latency. The following provides some non-limiting examples.

In the following example, instruction I1 is an ELU-type instruction, which has a non-deterministic latency in the example. Since instruction I1 has a non-deterministic latency, Equation 7 is used in each of the following examples, such that the edge latency is set to 1 regardless of the value of the initial edge latency.

EDGE_LATENCY(*ELU,ALU*)=1

EDGE_LATENCY(*ELU,ELU*)=1

EDGE_LATENCY(*ELU*,FLOW)=1

EDGE_LATENCY(*ELU,MEM*)=1

In the next example, instruction I1 is a MEM-type instruction that is assumed to have a dependence with instruction I2. In this example and with these assumptions, Equation 6 is used, such that the edge latency is set to 1 regardless of the value of the initial edge latency.

EDGE_LATENCY(*MEM,ALU*)=1

EDGE_LATENCY(*MEM,ELU*)=1

EDGE_LATENCY(*MEM*,FLOW)=1

EDGE_LATENCY(*MEM,MEM*)=1

In the next example, instruction I1, a FLOW-type instruction, has a hardware latency of 1 and a control dependence, rather than a data dependence. In this example, Equation 9 and the hardware latency of instruction I1 are used, such that the edge latency is set to 1, the initial edge latency.

EDGE_LATENCY(FLOW,*ALU*)=1

EDGE_LATENCY(FLOW,*ELU*)=1

EDGE_LATENCY(FLOW,FLOW)=1

EDGE_LATENCY(FLOW,*MEM*)=1

In accordance with one or more embodiments, in a case that there are no useful instructions that can be inserted (e.g., an independent instruction that implements a portion of the shader), the instruction scheduler 204 inserts a number of NOPs, or a WAIT instruction, to synchronize instruction execution. The following provides examples of shader code scheduled using the exemplary initial edge latencies, instruction distances and dependencies discussed above. In the example involving an ALU instruction discussed above, an initial edge latency of 5 is reduced by an instruction distance of 2, such that the resulting edge latency is determined to be equal to 3 using Equation 8, in connection with a first instruction I1 that is an ALU-type instruction and a second instruction I2 that is one of an ELU, FLOW and MEM-type instruction. An edge latency of 3 indicates that there are to be three execution cycles before the second ALU instruction is executed. Rather than the 4 NOPs that would have been required for a hardware latency of 5, in cases 1 to 4 below, two NOPs are inserted between the two instructions I1 and I2. With the first instruction accounting for one execution cycle, the two NOP instructions account for the last two execution cycles, so that the edge latency of 3 can be accommodated. This results in a reduction of 2 NOPs, which reduces execution time, results in fewer instructions that are to be executed, etc.

Case 1: an ALU instruction depends on an ALU instruction:
ALU
NOP
NOP
ALU

Case 2: an ELU instruction depends on an ALU instruction:
ALU
NOP
NOP
ELU

Case 3: a FLOW instruction depends on an ALU instruction:
ALU
NOP
NOP
FLOW

Case 4: a MEM instruction depends on an ALU instruction:
ALU
NOP
NOP
MEM

Cases 5 to 8 involve an ELU instruction as the predecessor instruction. In the example, the ELU instruction has a non-deterministic latency, which results in the edge latency being set to 1, per equation 7. Since the latency is non-deterministic, e.g., there is no determinable number of execution cycles, or NOPs, that are to be performed before the successor instruction is to be executed, the successor instruction awaits completion of execution of the ALU instruction.

Case 5: an ALU instruction depends on an ELU instruction:
ELU
(wait)ALU
Case 6: an ELU instruction depends on an ELU instruction:
ELU
(wait)ELU
Case 7: a FLOW instruction depends on an ELU instruction:
ELU
(wait)FLOW
Case 8: a MEM instruction depends on an ELU instruction:
ELU
(wait)MEM In cases 9 to 12, the dependence between the predecessor and successor instructions is considered to be a false dependence, which results in the edge latency being set to 1 per Equation 7. Since the dependence between the predecessor and successor instructions is a false dependence, the successor instruction awaits completion of execution of the predecessor MEM instruction.

Case 9: an ALU instruction depends on a MEM instruction:
MEM
(wait)ALU
Case 10: an ELU instruction depends on a MEM instruction:
MEM
(wait)ELU
Case 11: a FLOW instruction depends on a MEM instruction:
MEM
(wait)FLOW
Case 12: a MEM instruction depends on a MEM instruction:
MEM
(wait)MEM In the example of cases 13 to 16, the dependence is considered to be a control dependence, which results in the edge latency being set to 1, per Equation 9.

Case 13: an ALU instruction depends on a FLOW instruction:
FLOW
ALU
Case 14: an ELU instruction depends on a FLOW instruction:
FLOW
ELU
Case 15: a FLOW instruction depends on a FLOW instruction:
FLOW
FLOW
Case 16: a MEM instruction depends on a FLOW instruction:
FLOW
MEM Embodiments of the present disclosure reduce the initial edge latency and removes unnecessary NOPs. For example, in cases 1 to 4, the initial edge latency, which is equal to 5, is reduced by 2 to 3. Instead of using 4 NOPs, which would be required in a case of the initial edge latency, only 2 NOPs are used, thereby removing two unnecessary NOPs. Typical shaders are computation intensive and include a significant number of cases 1 to 4. Thus, a significant savings in execution resources can be achieved using embodiments of the present disclosure.

In accordance with one or more embodiments of the present disclosure, an instruction scheduler compares edge latencies to dynamic latencies in order to remove successors and predecessors. Smaller edge latencies result in early removal of successors and predecessors. The more successors and predecessors that can be removed, the more instructions can be considered to be independent and thus ready to be scheduled. The more instructions that are ready to be scheduled, the less likely NOPs are needed to be inserted into the code to compensate for hardware latencies. A reduction in the number of NOPs that need to be inserted in the scheduled code results in efficiencies in the code that is scheduled and executed. In a case that the code implements a shader, embodiments of the present disclosure can be used to identify reductions in edge latencies, to optimize scheduling output of the instruction scheduler and to optimize execution of the shader, for example. The example discussed above and reproduced below serves to provide an illustrative example:

I1: ADD R1.XYZ, R2.XYZ, R3.XYZ
I2: MUL R4.X, R1.X, R1.Y

In a case that the hardware latency between ADD and MUL is 3, absent use of embodiments of the present disclosure, the scheduled code would be as follows:

I1: ADD R1.XYZ, R2.XYZ, R3.XYZ
NOP
NOP
I2: MUL R4.X, R1.X, R1.Y

As discussed above, an instruction distance determined using at least one embodiment is 1. Using one or more embodiments of the present disclosure, an edge latency can be determined to be the hardware latency reduced by the instruction distance. Thus, instead of the two NOPs needed in the above scheduled code example, only one NOP is used in the following scheduled code example. As illustrated in the below instruction scheduler output, the number of NOPs is reduced to one NOP, rather than two NOPs in the above case:

I1: ADD R1.XYZ, R2.XYZ, R3.XYZ
NOP
I2: MUL R4.X, R1.X, R1.Y

The reduction in the number of NOPs is a result of the application of an instruction distance to an initial edge latency, e.g., a hardware latency. As discussed above, the instruction distance determined in accordance with one or more embodiments for these two instructions is equal to 1. In accordance with one or more such embodiments, the hardware latency of the predecessor instruction is reduced by the determined instruction distance to yield a reduced edge latency between the two instructions. As a result of the reduced edge latency, the number of NOPs can be reduced from two to one. The edge latency corresponds to two execution cycles, with the execution of I1 corresponding to one of the two cycles and the NOP corresponding to the second execution cycle. Advantageously, embodiments of the present disclosure reduce the number of NOPs determined to be unnecessary, such that the instruction scheduler can output no more than those NOPs that are necessary to achieve synchronization between two dependent instructions.

FIG. 8, which comprises FIGS. 8A to 8F, provides examples of instructions that implement a shader discussed in connection with one or more embodiments of the present disclosure. FIGS. 8A and 8B provide an example of a set of instructions that implement a shader input to an instruction scheduler. FIGS. 8C and 8D provide an example of output by an instruction scheduler without benefit of processing associated with one or more embodiments of the present disclosure. FIGS. 8E and 8F provide an example of output by an instruction scheduler that benefits from processing associated with one or more embodiments of the present disclosure.

In the examples shown in FIG. 8, an instruction scheduler using edge latency reduction in accordance with one or more embodiments of the present disclosure effectively reduces the number of NOPs from 48 in the output shown in FIGS. 8C and 8D to 40 in the output shown in FIGS. 8E and 8F, a reduction of 8 unnecessary NOPs from the shader instructions output of the instruction scheduler.

Examples of the reduction in the number of NOPs can be seen in connection with instructions 37, 44, 53, and 60. In each case, the number of NOPs is reduced from 3 to 1. To illustrate using instruction 37, without use of edge latency reduction, the code fragment output by the instruction scheduler (as shown in FIGS. 8C and 8D) is as follows:

36(154) type3: (rpt1/syn)fmac r18.z, (r)r16.y, (r)r15.y
37(219) type0: (rpt2)nop
38(157) type3: (lock)fmul dummy, r18.x, r18.x
39(158) type3: (rpt1)fmac r20.x, (r)r18.y, (r)r18.y In code fragment 812, both source operands of instruction 39 use the result of instruction 36, namely r18.z. In a case that the hardware latency of fmac is 4, absent use of one or more embodiments of the present disclosure, the initial edge latency of 4 is used to determine that 3 NOPs are to be inserted at instruction 37, in order to ensure that the latency requirement of 4 is met. Instruction 37 executes the first NOP and then two repetitions, to yield three execution cycles. With the execution of instruction 36, four execution cycles occur before instruction 38 is executed.

In contrast, with one or more embodiments of the present disclosure, the edge latency is reduced so that only one NOP is used. Code 822 from FIG. 8E is reproduced below as follows:

36(154) type3: (rpt1/syn)fmac r18.z, (r)r16.y, (r)r15.y
37(219) type0: nop
38(157) type3: (lock)fmul dummy, r18.x, r18.x
39(158) type3: (rpt1)fmac r20.x, (r)r18.y, (r)r18.y Instructions 36 and 39 are fmac, or floating point multiplication and accumulation. Instruction 39 is dependent on instruction 36, since their component masks (Z) and (YZ) share at least one component. When applying one or more embodiments, an instruction distance between instruction 36, as instruction I1, and instruction 39, as instruction I2 that is dependent and succeeds instruction I1, is determined. The component distance (C, S) is +INF for each of the components, except Z which has a component distance of 1. The instruction distance is the smallest of the component distances, or 1. The instruction distance is determined to be 1 because MASK_DIST(Z, YZ) is 1. The destination mask of fmac is Z not ZW because fmac does not increment a component index. With a useful instruction at 38, only one NOP is needed.

In one or more exemplary embodiments, the functions described can be implemented in hardware, software, and/or firmware, or any combination thereof. If implemented in hardware, the functions can be implemented in one or more microprocessors, microcontrollers, digital signal processors (DSPs), application specific integrated circuits (ASICs), field programmable gate arrays (FPGAs), or the like. Such components can reside within a communication system, data writing and/or reading system, or other systems. If implemented in software, the functions can be stored on or transmitted over as one or more instructions or code on a computer-readable medium. Computer-readable media includes tangible computer storage media and communication media including any medium that facilitates transfer of a computer program from one place to another. A storage media can be any available media that can be accessed by a computer. By way of example, and not limitation, such computer-readable media can comprise RAM, Flash memory, read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. The term "computer-readable medium" can also be defined as a tangible computer program product. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    identifying a dependence between two instructions in graphics processing instructions, one of the two instructions comprising a predecessor instruction and another of the two instructions comprising a successor instruction;
    determining an initial edge latency associated with the dependence between the predecessor and successor instructions, the initial edge latency being a hardware latency;
    determining an instruction distance corresponding to the predecessor and successor instructions; and
    reducing the initial edge latency by the determined instruction distance to determine a reduced edge latency associated with the dependence between the predecessor and successor instructions.

2. The method of claim 1, further comprising:
    scheduling execution of the successor instruction using the reduced edge latency.

3. The method of claim 1, further comprising:
    determining a number of synchronizing instructions to be executed prior to commencing execution of the successor instruction to synchronize execution of the predecessor and successor instructions, the number of synchronizing instructions being determined using the reduced edge latency, each synchronizing instruction being an independent instruction or a NOP.

4. The method of claim 1, wherein the graphics processing instructions implement a shader.

5. The method of claim 4, wherein the shader is a vertex shader.

6. The method of claim 4, wherein the shader is a fragment shader.

7. The method of claim 1, wherein the initial edge latency is a hardware latency associated with the predecessor instruction.

8. The method of claim 1, wherein the dependence comprises a flow dependence, such that a destination of the predecessor instruction is a source of the successor instruction.

9. The method of claim 1, wherein determining an instruction distance further comprises:
- determining a mask distance for each source operand of the successor instruction that corresponds to a destination operand of the predecessor instruction;
- selecting a smallest mask distance from the determined mask distances as the instruction distance.

10. The method of claim 9, wherein determining a mask distance for each source operand of the successor instruction further comprises:
- determining a component mask for the destination operand of the predecessor instruction and a component mask for the source operand of the successor instruction;
- generating a component string by concatenating the destination operand's component mask and the source operand's component mask;
- determining a component distance associated with each component in a component set using the component string; and
- identifying a smallest component distance of the determined component distances as the mask distance for the source operand.

11. The method of claim 10, wherein determining a component distance associated with each component in a component set using the component string further comprises:
- for each component in the component set:
- examining the component string to locate a first occurrence of the component in the component string;
- in a case that a first occurrence of the component is located, examining the component string to locate a second occurrence of the component in the component string, the second occurrence being after the first occurrence in the component string;
- in a case that a second occurrence of the component is located:
- determining a number of components between the first and second occurrences of the component in the component string; and
- setting the component distance for the component to the determined number of components.

12. The method of claim 11, wherein the graphics processing instructions implement a vertex shader and the component set comprises X, Y, Z and W components.

13. The method of claim 11, wherein the graphics processing instructions implement a fragment shader and the component set comprises R, G, B and A components.

14. An apparatus comprising:
- at least one programmable processing unit configured to implement at least a portion of a graphics pipeline; and
- an instruction scheduler configured to schedule instructions for execution by the at least one programmable processing unit using a reduced edge latency, said instruction scheduler configured to:
- identify a dependence between two instructions in graphics processing instructions, one of the two instructions comprising a predecessor instruction and another of the two instructions comprising a successor instruction;
- determine an initial edge latency associated with the dependence between the predecessor and successor instructions, the initial edge latency being a hardware latency;
- determine an instruction distance corresponding to the predecessor and successor instructions; and
- reducing the initial edge latency by the determined instruction distance to determine a reduced edge latency associated with the dependence between the predecessor and successor instructions.

15. The apparatus of claim 14, wherein said instruction scheduler is further configured to:
- determine a number of synchronizing instructions to be executed prior to said at least one programmable processing unit commencing execution of the successor instruction to synchronize execution of the predecessor and successor instructions, the number of synchronizing instructions being determined using the reduced edge latency, each synchronizing instruction being an independent instruction or a NOP.

16. The apparatus of claim 14, wherein said at least one programmable processing unit implements a shader based on the graphics processing instructions.

17. The apparatus of claim 16, wherein said shader is a vertex shader.

18. The apparatus of claim 16, wherein said shader is a fragment shader.

19. The apparatus of claim 14, wherein the initial edge latency is a hardware latency associated with execution of the predecessor instruction by said at least one programmable processing unit.

20. The apparatus of claim 14, wherein the dependence comprises a flow dependence, such that a destination of the predecessor instruction is a source of the successor instruction.

21. The apparatus of claim 14, wherein said instruction scheduler configured to determine an instruction distance is further configured to:
- determine a mask distance for each source operand of the successor instruction that corresponds to a destination operand of the predecessor instruction;
- select a smallest mask distance from the determined mask distances as the instruction distance.

22. The apparatus of claim 21, wherein said instruction scheduler configured to determine a mask distance for each source operand of the successor instruction is further configured to:
- determine a component mask for the destination operand of the predecessor instruction and a component mask for the source operand of the successor instruction;
- generate a component string by concatenating the destination operand's component mask and the source operand's component mask;
- determine a component distance associated with each component in a component set using the component string; and
- identify a smallest component distance of the determined component distances as the mask distance for the source operand.

23. The apparatus of claim 22, wherein said instruction scheduler configured to determine a component distance associated with each component in a component set using the component string is further configured to:
- for each component in the component set:
- examine the component string to locate a first occurrence of the component in the component string;
- in a case that a first occurrence of the component is located, examine the component string to locate a second occurrence of the component in the component string, the second occurrence being after the first occurrence in the component string;
- in a case that a second occurrence of the component is located:
- determine a number of components between the first and second occurrences of the component in the component string; and
- set the component distance for the component to the determined number of components.

24. The apparatus of claim 23, wherein said at least one programmable processing unit implements a vertex shader using the graphics processing instructions, and the component set comprises X, Y, Z and W components.

25. The apparatus of claim 23, wherein said at least one programmable processing unit implements a fragment shader using the graphics processing instructions, and the component set comprises R, G, B and A components.

26. A computer-readable non-transitory memory medium in which computer-executable program code is stored, the program code comprising code to:
identify a dependence between two instructions in graphics processing instructions, one of the two instructions comprising a predecessor instruction and another of the two instructions comprising a successor instruction;
determine an initial edge latency associated with the dependence between the predecessor and successor instructions, the initial edge latency being a hardware latency;
determine an instruction distance corresponding to the predecessor and successor instructions; and
reduce the initial edge latency by the determined instruction distance to determine a reduced edge latency associated with the dependence between the predecessor and successor instructions.

27. The medium of claim 26, the program code further comprising code to:
schedule execution of the successor instruction using the reduced edge latency.

28. The medium of claim 26, the program code further comprising code to:
determine a number of synchronizing instructions to be executed prior to commencing execution of the successor instruction to synchronize execution of the predecessor and successor instructions, the number of synchronizing instructions being determined using the reduced edge latency, each synchronizing instruction being an independent instruction or a NOP.

29. The medium of claim 26, wherein the graphics processing instructions implement a shader.

30. The medium of claim 29, wherein the shader is a vertex shader.

31. The medium of claim 29, wherein the shader is a fragment shader.

32. The medium of claim 26, wherein the initial edge latency is a hardware latency associated with the predecessor instruction.

33. The medium of claim 26, wherein the dependence comprises a flow dependence, such that a destination of the predecessor instruction is a source of the successor instruction.

34. The medium of claim 26, wherein the program code configured to determine an instruction distance further comprises code to:
determine a mask distance for each source operand of the successor instruction that corresponds to a destination operand of the predecessor instruction;
select a smallest mask distance from the determined mask distances as the instruction distance.

35. The medium of claim 34, wherein the program code configured to determine a mask distance for each source operand of the successor instruction further comprises code to:
determine a component mask for the destination operand of the predecessor instruction and a component mask for the source operand of the successor instruction;
generate a component string by concatenating the destination operand's component mask and the source operand's component mask;
determine a component distance associated with each component in a component set using the component string; and
identify a smallest component distance of the determined component distances as the mask distance for the source operand.

36. The medium of claim 35, wherein the program code configured to determine a component distance associated with each component in a component set using the component string further comprises code to:
for each component in the component set:
examine the component string to locate a first occurrence of the component in the component string;
in a case that a first occurrence of the component is located, examine the component string to locate a second occurrence of the component in the component string, the second occurrence being after the first occurrence in the component string;
in a case that a second occurrence of the component is located:
determine a number of components between the first and second occurrences of the component in the component string; and
set the component distance for the component to the determined number of components.

37. The medium of claim 36, wherein the graphics processing instructions implement a vertex shader and the component set comprises X, Y, Z and W components.

38. The medium of claim 36, wherein the graphics processing instructions implement a fragment shader and the component set comprises R, G, B and A components.

39. An apparatus comprising:
at least one programmable processing unit configured to implement at least a portion of a graphics pipeline; and
an instruction scheduling means configured to schedule instructions for execution by said at least one programmable processing unit using a reduced edge latency, said instruction scheduling means comprising:
means for identifying a dependence between two instructions in graphics processing instructions, one of the two instructions comprising a predecessor instruction and another of the two instructions comprising a successor instruction;
means for determining an initial edge latency associated with the dependence between the predecessor and successor instructions, the initial edge latency being a hardware latency;
means for determining an instruction distance corresponding to the predecessor and successor instructions; and
means for reducing the initial edge latency by the determined instruction distance to determine a reduced edge latency associated with the dependence between the predecessor and successor instructions.

40. The apparatus of claim 39, said instruction scheduling means further comprising:
means for determining a number of synchronizing instructions to be executed prior to commencing execution of the successor instruction to synchronize execution of the predecessor and successor instructions, the number of synchronizing instructions being determined using the reduced edge latency, each synchronizing instruction being an independent instruction or a NOP.

41. The apparatus of claim 39, wherein said at least one programmable processing unit implements a shader based on the graphics processing instructions.

42. The apparatus of claim 41, wherein said shader is a vertex shader.

43. The apparatus of claim 41, wherein said shader is a fragment shader.

44. The apparatus of claim 39, wherein the initial edge latency is a hardware latency associated with execution of the predecessor instruction by said at least one programmable processing unit.

45. The apparatus of claim 39, wherein the dependence comprises a flow dependence, such that a destination of the predecessor instruction is a source of the successor instruction.

46. The apparatus of claim 39, wherein said means for determining an instruction distance further comprises:
   means for determining a mask distance for each source operand of the successor instruction that corresponds to a destination operand of the predecessor instruction;
   means for selecting a smallest mask distance from the determined mask distances as the instruction distance.

47. The apparatus of claim 46, wherein said means for determining a mask distance for each source operand of the successor instruction further comprises:
   means for determining a component mask for the destination operand of the predecessor instruction and a component mask for the source operand of the successor instruction;
   means for generating a component string by concatenating the destination operand's component mask and the source operand's component mask;
   means for determining a component distance associated with each component in a component set using the component string; and
   means for identifying a smallest component distance of the determined component distances as the mask distance for the source operand.

48. The apparatus of claim 47, wherein said means for determining a component distance associated with each component in a component set using the component string further comprises:
   for each component in the component set:
      means for examining the component string to locate a first occurrence of the component in the component string;
      in a case that a first occurrence of the component is located, means for examining the component string to locate a second occurrence of the component in the component string, the second occurrence being after the first occurrence in the component string;
      in a case that a second occurrence of the component is located:
      means for determining a number of components between the first and second occurrences of the component in the component string; and
      means for setting the component distance for the component to the determined number of components.

49. The apparatus of claim 48, wherein said at least one programmable processing unit implements a vertex shader using instructions from the graphics processing instructions, and the component set comprises X, Y, Z and W components.

50. The apparatus of claim 48, wherein said at least one programmable processing unit implements a fragment shader using instructions from the graphics processing instructions, and the component set comprises R, G, B and A components.

* * * * *